United States Patent [19]

Futami et al.

[11] 4,028,431

[45] June 7, 1977

[54] CURED RUBBER COMPOSITION

[75] Inventors: Takashi Futami, Hirakata; Yoshiharu Tatsukami, Niihama; Toyoji Takamoto, Takatsuki; Yasuhiro Oda, Takatsuki; Masayasu Tomoda, Takatsuki, all of Japan

[73] Assignees: Daikin Kogyo Co., Ltd.; Sumitomo Chemical Company, Limited, both of Osaka, Japan

[22] Filed: May 12, 1975

[21] Appl. No.: 576,366

[30] Foreign Application Priority Data

May 15, 1974 Japan .............................. 49-54889
May 15, 1974 Japan .............................. 49-54890

[52] U.S. Cl. .............................. 260/827; 260/42.26; 260/897 C

[51] Int. Cl.² .................. C08L 23/00; C08L 23/28; C08L 83/00

[58] Field of Search ........................ 260/827, 897 C

[56] References Cited

UNITED STATES PATENTS

| | | | |
|---|---|---|---|
| 2,710,290 | 6/1955 | Safford et al. | 260/827 |
| 2,927,908 | 3/1960 | Konkle et al. | 260/827 |
| 2,934,515 | 4/1960 | Konkle et al. | 260/827 |
| 3,132,116 | 5/1964 | Wilkus | 260/827 |
| 3,207,825 | 9/1965 | Tully | 264/127 |
| 3,372,136 | 3/1968 | Kometami | 260/900 |
| 3,449,290 | 6/1969 | Foster | 260/827 |
| 3,562,195 | 2/1971 | Reiner | 260/23.5 |
| 3,864,433 | 2/1975 | Taksuami | 260/897 C |
| 3,865,897 | 2/1975 | Falender | 260/900 |
| 3,969,308 | 7/1976 | Penneck | 260/827 |

FOREIGN PATENTS OR APPLICATIONS

| | | |
|---|---|---|
| 754,164 | 8/1956 | United Kingdom |
| 1,284,081 | 8/1972 | United Kingdom |

*Primary Examiner*—Paul Lieberman
*Attorney, Agent, or Firm*—Stevens, Davis, Miller & Mosher

[57] ABSTRACT

A cured rubber composition, which is obtained by curing a composition consisting essentially of a fluorine-containing ethylene copolymer and a silicone rubber and/or a fluorine-containing polymer with an organic peroxide as a curing agent. The cured rubber composition is excellent in heat, chemical, oil and solvent resistance, and hence can be used portions where the conventional synthetic rubber have not been usable.

17 Claims, No Drawings

CURED RUBBER COMPOSITION

This invention relates to a cured rubber composition prepared by curing a composition consisting essentially of (A) a fluorine-containing ethylene copolymer and (B) a silicone rubber and/or a fluorine-containing copolymer. More particularly, it relates to a cured rubber composition prepared by curing a composition consisting essentially of (A) a fluorine-containing ethylene copolymer of ethylene, hexafluoropropene and, if necessary, other ethylenically unsaturated monomers and (B) a silicone rubber prepared by polycondensation of a silanol compound represented by the general formula

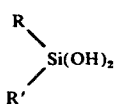

(wherein R and R' are saturated aliphatic groups, unsaturated aliphatic groups, aromatic groups, or derivatives of these groups) alone or polycondensation of a combination of two or more of said silanol compounds, and/or (C) a fluorine-containing copolymer of vinylidene fluoride and at least one of other fluorine-containing olefinic monomers with an organic peroxide as a curing agent.

The fluorine-containing ethylene copolymer (A) has been known to be easily workable on a roll-mill and able to give a cured product by primary curing alone by means of a press, etc., which is excellent in mechanical properties and in resistance to heat, oil, ozone, and radiation. Accordingly, such a copolymer has found wide uses in a variety of industries such as chemical, mechanical, electric, and electronic. However, it has a disadvantage of being inferior in low-temperature properties to commercial acrylic rubbers and silicone rubbers which are known as heat-resistant rubbers. It is, therefore, required to be improved in said low-temperature properties and also in heat resistance as well as in oil resistance. Although there have been made attempts to improve the low-temperature properties by incorporating various plasticizers or to improve the heat resistance by adding an antioxidant, yet no satisfactory result has so far been achieved.

The present inventors engaged in extensive investigations to improve the heat resistance, low-temperature properties, and oil resistance and as a result found that a blend composition comprising (A) a fluorine-containing ethylene copolymer and (B) a silicone rubber and/or (C) a fluorine-containing copolymer is satisfactorily curable with an organic peroxide as a curing agent and gives a cured rubber excellent in heat resistance, low-temperature properties, and oil resistance. Based on this finding the present invention has now been accomplished.

An object of this invention is to provide a novel curable rubber composition improved in heat resistance, low-temperature properties, and oil resistance of the fluorine-containing ethylene copolymer (A).

Another object of this invention is to provide a novel elastomer excellent in heat resistance, low-temperature properties, and oil resistance, which is obtained by curing a composition consisting essentially of (A) a fluorine-containing ethylene copolymer and (B) a silicone rubber and/or (C) a fluorine-containing copolymer with an organic peroxide used as curing agent.

The copolymer (A) of ethylene and hexafluoropropene and, if necessary, an ethylenically unsaturated monomer, which is used in this invention, is prepared by a number of processes e.g. a process in which a mixture of ethylene, hexafluoropropene, and, if necessary, an ethylenically unsaturated monomer is polymerized in the presence of a free radical initiator under such polymerization conditions as a temperature of 40° to 300° C and a pressure of 40 to 4,000 kg/cm²; a process of adding to the polymerization system a polymerization modifier selected from hydrocarbons such as ethene, propane, propylene, and the like, and aliphatic ketones and aldehydes; and an emulsion or suspension polymerization process to be carried out under a relatively low pressure.

A desirable hexafluoropropene content of the fluorine-containing ethylene copolymer (A) is in the range from 10 to 50 mole-%, depending on the desired properties of the intended elastomer.

The ethylenically unsaturated monomers for use in the present composition include olefins having 3 to 18 carbon atoms; vinyl esters containing a saturated carboxylic acid moiety having 2 to 6 carbon atoms; acrylic acid esters and methacrylic acid esters containing a saturated alcohol moiety having 1 to 8 carbon atoms; maleic anhydride; maleic acid mono- and diesters containing a saturated alcohol moiety having 1 to 8 carbon atoms; vinyl halides, vinylidene halides, vinyl ethers, carboxylic acid amides, and aromatic vinyl compounds.

The content of the ethylenically unsaturated monomer in the fluorine-containing ethylene polymer may be in the range from 0 to 50 mole-%, depending on the desired properties of the intended elastomer.

Examples of individual ethylenically unsaturated monomers are propylene, buten-1, isobutylene, pentene-1, hexene-1, octene-1, 3-methyl-1-butene, 3,3-dimethyl-1-butene, 4-methyl-1-pentene, 4,4-dimethyl-1-pentene, 3-methyl-1-pentene, 3,3-dimethyl-1-pentene, decene-1, 5-methyl-1-pentene, octadecene-1; methyl, ethyl, n-propyl, n-butyl, and n-octyl acrylates, methacrylates, crotonates, maleates, fumarates, itaconates, acid maleates, and acid fumarates; vinyl formate, vinyl acetate, vinyl propionate, vinyl butyrate, vinyl laurate, vinyl stearate, vinyl crotonate, vinyl linoleate, vinyl pivalate, vinyl trifluoroacetate; cyclopentyl and cyclohexyl acrylates, methacrylates and crotonates; cyanomethyl, β-cyanoethyl, and β-cyanopropyl acrylates, methacrylates, and cortonates; hydroxymethyl, hydroxyethyl, hydroxypropyl, and hydroxyoctyl acrylates, methacrylates, and crotonates; aminomethyl, aminoethyl, aminopropyl, aminobutyl, and aminohexyl acrylates, methacrylates, and crotonates; acrylonitrile, methacrylonitrile, vinyl chloride, vinyl fluoride, vinylidene chloride, vinylidene fluoride, 1,1,2-trichloroethylene, 1,1,2-trifluoroethylene, tetrachloroethylene, tetrafluoroethylene, 1,1-chlorofluoroethylene, 1,2-difluoroethylene, 1,2-dichloroethylene, 1,1-dichloro-2-fluoroethylene, trifluorochloroethylene, methyl vinyl ether, ethyl vinyl ether, phenyl vinyl ether, acrylamides, methacrylamides; N-alkyl-substituted acrylamides such as, for example, N-methylacrylamide, N-ethylacrylamide, N-n-propylacrylamide, N-n-butylacrylamide, N-isobutylacrylamide, N-tert-butylacrylamide, N-amylacrylamide, N-octylacrylamide, N-2-ethylhexylacrylamide, and corresponding N-alkyl-substituted methacrylamides; N,N-dialkyl-substituted acrylamides such as, for example, N,N-dimethylacrylamide, N,N-diethylacrylamide, N,N-di-n-butylacrylamide, and corresponding N,N-dialkyl-substituted methacrylamide; N-methyl-N-vinylacetamide, styrene, and methylstyrene. Of these, particularly preferred are methyl or ethyl esters of acrylic acid and methacrylic acid, vinyl chloride, vinyl fluoride, vinylidene chloride, vinylidene fluoride, tetrafluoroethylene, and trifluorochloroethylene.

The silicone rubber (B) used in this invention is prepared by polycondensation of a silanol compound, according to a known process in the presence of a catalyst, particularly an acid or alkaline catalyst well-known in this technical field. Such a condensation polymer, as is generally known, contains polydimethylsiloxane as the major constituent and the derivatives thereof having ethyl, vinyl, phenyl, and, fluoroalkyl groups introduced in the side chain in various proportions, according to the requirement of cure rate and physical properties.

The fluorine-containing copolymer (C) of vinylidene fluoride and at least one of other fluorine-containing olefinic monomer is prepared by copolymerizing vinylidene fluoride and at least one of other fluorine-containing olefinic monomers in the presence of a free radical initiator under well-known polymerization conditions. Such a copolymer is composed of vinylidene fluoride and at least one of the fluorine-containing olefinic monomers such as hexafluoropropene, pentafluoropropene, trifluoroethylene, trifluorochloroethylene, vinyl fluoride, perfluoro(methyl vinyl ether), and perfluoro(propyl vinyl ether). Particularly preferred are a copolymer composed of 92 to 66 mole-% of vinylidene fluoride and 8 to 34 mole-% of hexafluoropropene and a terpolymer composed of 28 to 85.7 mole-% of vinylidene fluoride, 9.3 to 42 mole-% of hexafluoropropene, and 5 to 30 mole-% of tetrafluoroethylene.

The organic peroxide used in this invention is an organic compound having the linkage —(O—O)—. Such compounds include ketone peroxides and peroxyketals, as represented by the general formulas,

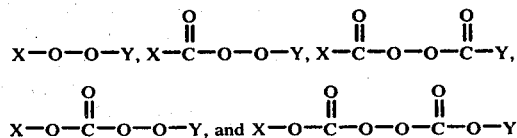

wherein X is an alkyl group or aralkyl group, having 1 to 20 carbon atoms or a derivative goup thereof; Y is an alkyl group or aralkyl group having 1 to 20 carbon atoms or a derivative group thereof, or hydrogen atom, and X and Y may be same or different from each other.

Examples of individual organic peroxides are tert-butyl hydroperoxide, p-methane hydroperoxide, cumene hydroperoxide, diisopropylbenzene hydroperoxide, di-tert-butyl peroxide, 2,5-dimethyl-2,5-di(tert-butylperoxy)hexane, 2,5-dimethyl-2,5-di(tert-butylperoxy)-hexyne-3, tert-butyl cumyl peroxide, dicumyl peroxide, α,α'-di(tert-butylperoxy) diisopropylbenzene, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl peroxycarbonate, acetyl cyclohexanesulfonyl peroxide, tert-butyl peracetate, tert-butyl perisobutyrate, tert-butyl perpivalate, tert-butyl per-2-ethylhexanoate, tert-butyl perneodecanoate, tert-butyl peroxybenzoate, tert-butyl isopropanol percarbonate, methyl ethyl ketone peroxide, cyclohexanone peroxide, 1,1-di(tert-butylperoxy)cyclohexane, and 1,1-di(tert-butylperoxy)-3,5,5-trimethylcyclohexane. Of these, particularly preferred are tert-butyl cumyl peroxide, dicumyl peroxide, decanoyl peroxide, benzoyl peroxide, and tert-bytyl peroxybenzoate.

In order to improve cure rate of the present composition and physical properties of the cured rubber, a curing promoter can be added to the composition. Preferable promoters are triallyl esters of cyanuric acid, isocyanuric acid, and benzenetricarboxylic acid; diallyl terephthalate, and N,N'-methylenebisacrylamide.

Further, if necessary, the present composition can be incorporated with various additives usually used in ordinary rubber compositions e.g. inorganic fillers such as carbon black, talc, silica, calcium carbonate, barium sulfate, and clay, and acid acceptors such as magnesium oxide, zinc oxide, and calcium oxide, and plasticizers.

The proportion of the silicone rubber (B) and/or fluorine-containing copolymer (C) to the fluorine-containing ethylene copolymer (A) in the present composition can be optional, but preferably it is 1 to 95 parts by weight to 99 to 5 parts by weight of the latter, most preferably 5 to 75 parts by weight to 95 to 25 parts by weight of the latter.

The amount of the organic peroxide to be incorporated in the composition consisting essentially of a fluorine-containing ethylene copolymer (A) and a silicone rubber (B) and/or a fluorine-containing copolymer (C) is 0.1 to 15 parts by weight for 100 parts by weight of said composition. If the amount of the organic peroxide is below 0.1 part by weight, curing rate becomes low, while if said amount exceeds 15 parts by weight, no further improvement of physical properties are obtained so that economical disadvantages are brought about. Preferably, 1 to 8 parts by weight are used.

The amount to be used of the curing promoter is generally 1 to 20 preferably 2 to 5, parts by weight for 100 parts by weight of the composition comprising (A) and (B) and/or (C). Other additives can be incorporated in suitable proportions.

The present compositions can be prepared by use of usually used rubber-processing machines such as a roll-mill or a kneader.

The composition thus obtained can be cured at a curing temperature of 120° to 200° C under a pressure of 0.5 to 200 kg/cm² for 5 to 60 minutes by the conventional curing methods such as compression molding by using a hot press, a direct and indirect vapor curing using a vapor, and curing by indirect heating. If necessary, the composition can be post-cured in an oven at 110° to 230° C for 0.5 to 24 hours.

On being cured, the present compositions yields a cured product excellent in heat resistance, oil resistance, chemical resistance, and low-temperature properties. Accordingly, the present composition can be used where conventional rubbers have failed to be of service, that is for O-rings, gaskets, mechanical hoses, and fuel hoses which are required to be resistant to heat and high-temperature oils and also those O-rings, diaphragms, fuel tank linings which are required to resist acids and alkalis. Further, because of excellent low-temperature properties, it is also suitable for manufacturing gaskets for refrigerated showcases and hot-air ducts and gaskets for preventing freezing.

The invention is illustrated below with reference to Examples, but the invention is not limited thereto. In Examples the formulations were shown in parts by weight. Measurement of mechanical properties, heat resistance, and oil resistance was carried out according to the method specified in JIS K 6301. The low-temperature properties were evaluated by the Gehman torsion test in accordance with the method specified in ASTM D 1053.

EXAMPLE 1

A stainless steel reactor equipped with an inlet, an outlet, a stirrer and a temperature regulator was fed with a mixture comprising 70 mole-% of ethylene and 30 mole-% of hexafluoropropene at the rate of 4 kg/hour per liter of inner volume of the reactor. Simultaneously tert-butyl peroxy-2-ethylhexanoate as a free radical initiator was added to the reactor at the rate of 5 g/hour. During the polymerization, the inner pressure and the inner temperature were maintained at 1600 kg/cm² and 160° C, respectively. Thus an ethylene-hexafluoropropene copolymer containing 29 mole-% of hexafluoropropene was formed at the rate of 28 kg/hour. Intrinsic viscosity of the resulting copolymer measured in methyl ethyl ketone at 30° C was 0.75.

This copolymer and a silicone rubber (Toray Silicone SH410, a product of Toray Silicone Co.) containing, as the main constituent, polydimethylsiloxane having some vinyl groups introduced in side chains were milled together in a proportion given in Table 1, by means of a 6-inch open roll-mill at 40° to 70° C. The milled mixture (100 parts) was then compounded with Hi-Sil 233 as filler, magnesium oxide as acid acceptor, benzoyl peroxide as curing agent, and triallyl isocyanurate as curing promoter, in proportions as shown in Table 1, by means of the same roll-mill. The compounded stock was cured at 120° C under a pressure of 100 kg/cm² to obtain a sheet, 1 mm in thickness, with smooth surfaces.

The cured sheets obtained from the compounds containing silicone rubber (No. 2 to No. 5 in Table 1) were subjected to secondary curing in a Geer oven at 150° C for 5 hours. Physical properties of the thus cured sheets were as shown in Table 1.

In Table 1, No. 2, No. 3, and No. 4 were run as Examples of this invention; No. 1 and No. 5 were run as Comparative Examples to examine, for comparison, physical properties of cured rubbers from a fluorine-containing ethylene copolymer alone and a silicone rubber alone, respectively.

Table 1

| Formulation; physical properties | No. 1 | No. 2 | No. 3 | No. 4 | No. 5 |
|---|---|---|---|---|---|
| Formulation: | | | | | |
| F-containing ethylene copolymer | 100 | 75 | 50 | 25 | — |
| Silicone rubber | — | 25 | 50 | 75 | 100 |
| Hi-Sil 233*¹ | 20 | 20 | 20 | 20 | 20 |
| Magnesium oxide | 15 | 11.2 | 7.5 | 3.8 | — |
| Benzoyl peroxide | 3 | 2.5 | 2 | 1.5 | 1 |
| Triallyl isocyanurate | 3 | 2.2 | 1.5 | 0.8 | — |
| Press curing temp. (° C) | 120 | 120 | 120 | 120 | 120 |
| Press curing time (min.) | 30 | 15 | 10 | 10 | 10 |
| Secondary curing temp. (° C.) | — | 150 | 150 | 150 | 150 |
| Secondary curing time (hour) | — | 5 | 5 | 5 | 5 |
| Mechanical properties (room temp.) | | | | | |
| Tensile strength (kg/cm²) | 274 | 70 | 27 | 16 | 20 |
| Elongation (%) | 380 | 190 | 110 | 100 | 140 |
| Hardness (JIS-A) | 75 | 71 | 61 | 51 | 44 |
| Heat resistance (200° C, 120 hours) | | | | | |
| Retention of tensile strength (%) | 39 | 83 | 78 | 88. | 95 |
| Retention of elongation (%) | 11 | 26 | 27 | 40 | 86 |
| Oil resistance (ASTM No. 3 oil; 150° C, 70 hours) | | | | | |
| Volume change (%) | +22 | +31 | +34 | +46 | +46 |
| **Low-temperature properties (Gehman test*²)** | | | | | |
| $T_2$ (° C) | −8 | −19 | −26 | −44 | −50 |
| $T_5$ (° C) | −14 | −26 | −45 | −52 | −52 |
| $T_{10}$ (° C) | −16 | −31 | −49 | −53 | −54 |

Note:
*¹Hydrated silica, produced by PPG Co., U.S.A.
*²$T_n$ of the Gehman test is the temperature at which the modulus of a test specimen becomes n times the modulus at room temperature.

EXAMPLE 2

An ethylene-hexafluoropropene copolymer having an intrinsic viscosity of 0.91 as measured in methyl ethyl ketone at 30° C and 25 mole % of hexafluoropropene, which had been prepared with an apparatus similar to that of Example 1, was blended with silicone rubber (which is the same as used in Example 1) in the proportion as shown in Table 2 by the use of a roll-mill at 40° to 70° C. Then the resulting mixture was kneaded with other components as shown in Table 2 and cured in a similar manner to Example 1. Physical properties of the cured product are shown in Table 2.

In Table 2, No. 7, No. 8, No. 9 were run as Examples of this invention, while No. 6 was run as Comparative Example to examine physical properties of the cured composition containing a fluorine-containing ethylene copolymer alone.

Table 2

| Formulation; physical properties | No. 6 | No. 7 | No. 8 | No. 9 |
|---|---|---|---|---|
| Formulation: | | | | |
| F-containing ethylene copolymer | 100 | 75 | 50 | 25 |
| Silicone rubber | — | 25 | 50 | 75 |
| Hi-Sil 233 | 20 | 20 | 20 | 20 |
| Magnesium oxide | 15 | 11.2 | 7.5 | 3.8 |
| Benzoyl peroxide | 3 | 2.5 | 2 | 1.5 |
| Triallyl isocyanurate | 3 | 2.2 | 1.5 | 0.8 |
| Press curing temp. (° C) | 120 | 120 | 120 | 120 |
| Press curing time (min.) | 30 | 15 | 10 | 10 |
| Secondary curing temp. (° C) | — | 150 | 150 | 150 |
| Secondary curing time (hour) | — | 5 | 5 | 5 |
| Mechanical properties (room temp.) | | | | |
| Tensile strength (kg/cm²) | 230 | 84 | 62 | 32 |
| Elongation (%) | 350 | 200 | 210 | 160 |
| Hardness (JIS-A) | 77 | 69 | 63 | 52 |
| Heat resistance (200° C, 120 hours) | | | | |
| Retention of tensile strength (%) | 39 | 109 | 73 | 59 |
| Retention of elongation (%) | 3 | 10 | 10 | 38 |
| Low-temperature properties (Gehman test) | | | | |
| $T_2$ (° C) | −14 | −23 | −30 | −46 |
| $T_5$ (° C) | −22 | −30 | −39 | −52 |

Table 2-continued

| Formulation; | No. | | | |
|---|---|---|---|---|
| physical properties | 6 | 7 | 8 | 9 |
| $T_{10}$ (° C) | −25 | −33 | −43 | −53 |

EXAMPLE 3

An ethylene-hexafluoropropene-tetrafluoroethylene terpolymer having an intrinsic viscosity of 1.02 as measured in methyl ethyl ketone at 30° C and 20 mole-% of hexafluoropropene and 10 mole-% of tetrafluoroethylene, which had been prepared with an apparatus similar to that of Example 1, was blended with silicone rubber (which is the same as used in Example 1) in the proportion as shown in Table 3 by the use of a roll-mill at 40° to 70° C. Then the resulting mixture was kneaded with other components as shown in Table 3 and cured in a similar manner to Example 1. Physical properties of the cured product are shown in Table 3.

In Table 3, No. 11, No. 12, No. 13 were run as Examples of this invention, while No. 10 was run as Comparative Example to examine physical properties of the cured compositions containing a fluorine-containing ethylene terpolymer alone.

Table 3

| Formulation; | No. | | | |
|---|---|---|---|---|
| physical properties | 10 | 11 | 12 | 13 |
| Formulation: | | | | |
| F-containing ethylene terpolymer | 100 | 75 | 50 | 25 |
| Silicone rubber | — | 25 | 50 | 75 |
| Hi-Sil 233 | 20 | 20 | 20 | 20 |
| Magnesium oxide | 15 | 11.2 | 7.5 | 3.8 |
| Benzoyl peroxide | 3 | 2.5 | 2 | 1.5 |
| Triallyl isocyanurate | 3 | 2.2 | 1.5 | 0.8 |
| Press curing temp. (° C) | 120 | 120 | 120 | 120 |
| Press curing time (min.) | 30 | 15 | 10 | 10 |
| Secondary curing temp. (° C) | — | 150 | 150 | 150 |
| Secondary curing time (hour) | — | 5 | 5 | 5 |
| Mechanical properties (room temp.) | | | | |
| Tensile strength (kg/cm²) | 210 | 76 | 58 | 28 |
| Elongation (%) | 380 | 220 | 210 | 180 |
| Hardness (JIS-A) | 73 | 68 | 61 | 50 |
| Heat resistance (200° C, 120 hours) | | | | |
| Retention of tensile strength (%) | 42 | 78 | 83 | 81 |
| Retention of elongation (%) | 20 | 38 | 40 | 49 |
| Oil resistance (ASTM No. 3 oil; 150° C, 70 hours) | | | | |
| Volume change (%) | +15 | +28 | +35 | +45 |

EXAMPLE 4

Prescribed quantities of an ethylene-hexafluoropropene copolymer containing 24.6 mole-% of hexafluoropropene and having an intrinsic viscosity of 1.42, as measured in methyl ethyl ketone at 30° C, and a vinylidene fluoride-tetrafluoroethylene-hexafluoropropene copolymer (Daiel®G-501, produced by Daikin Kōgyo Co.) were masticated on a two-roll mill. To 100 parts of the resulting homogeneous mixture, were successively added with continued milling 20 parts of MT carbon black, 1 part of stearic acid, 15 parts of magnesium oxide as acid acceptor, 4 parts of dicumyl peroxide as curing agent, and 4 parts of triallyl trimellitate as curing promoter.

After having been milled, the stock was passed through the roll clearance to form a sheeting of standard thickness which was press-cured in a standard mold at 160° C for 20 minutes to obtain a cured sheet (No. 14, No. 15, and No. 16).

For comparison, a cured sheet was prepared in the same manner as mentioned above, except that the vinylidene fluoride copolymer was not used and 2 parts of stearic acid was used (No. 17).

Physical properties of the cured sheets were as shown in Table 4.

Table 4

| Formulation; | No. | | | |
|---|---|---|---|---|
| physical properties | 14 | 15 | 16 | 17 |
| Formulation | | | | |
| Ethylene-hexafluoropropene copolymer | 80 | 50 | 20 | 100 |
| Daiel®G-501 | 20 | 50 | 80 | 0 |
| MT carbon black*¹ | 20 | 20 | 20 | 20 |
| Stearic acid | 1 | 1 | 1 | 2 |
| Magnesium oxide*² | 15 | 15 | 15 | 15 |
| Dicumyl peroxide | 4 | 4 | 4 | 4 |
| Triallyl trimellitate | 4 | 4 | 4 | 4 |
| Mechanical properties (room temp.): | | | | |
| 100 % Modulus (kg/cm²) | 21 | 20 | 21 | 24 |
| Tensile strength (kg/cm²) | 171 | 132 | 115 | 159 |
| Elongation (%) | 320 | 360 | 440 | 260 |
| Properties after aging in heated air*³: | | | | |
| 100 % Modulus (kg/cm²) | — | 134 | 81 | 21 |
| Tensile strength (kg/cm²) | 143 | 134 | 136 | 97 |
| Elongation (%) | 90 | 100 | 220 | 365 |

Note:
*¹"Thermax" (R. T. Vanderbilt Co.)
*²"Kyowa Mag" (Kyowa Kagaku Co.)
*³Aged in a test tube at 230° C for 48 hours, except for the case of No. 17, wherein aging was carried out at 230° C for 16 hours.

In Examples 5, 6 and 7 which follow, the carbon black and magnesium oxide used also "Thermax" and "Kyowa Mag", respectively.

EXAMPLE 5

Prescribed quantities of an ethylene-hexafluoropropene copolymer containing 29 mole-% of hexafluoropropene and having an intrinsic viscosity of 0.71, as measured in methyl ethyl ketone at 30° C, and the same Daiel® G-501 as used in Example 4 were masticated on a two-roll mill. To 100 parts of the resulting homogeneous mixture, was added with continued milling a mixture comprising 20 parts (or 5 parts in the case of No. 20) of MT carbon black, 15 parts (or 30 parts in the case of No. 20) of magnesium oxide as acid acceptor, 3.7 parts of tert-butyl peroxybenzoate as curing agent, and 2.5 parts of triallyl isocyanurate as curing promoter.

After having been milled, the stock was passed through the roll clearance to form a sheeting of standard thickness which was press-cured in a standard mold at 150° C or 160° C for 12 to 22 minutes to obtain a cured sheet (No. 18, 19 and 20).

For comparison, a cured sheet was prepared in the same manner as mentioned above, except that the vinylidene fluoride copolymer was not used (No. 21).

Physical properties of the cured sheets were as shown in Table 5.

Table 5

| Formulation; | No. | | | |
|---|---|---|---|---|
| physical properties | 18 | 19 | 20 | 21 |
| Formulation: | | | | |

Table 5-continued

| Formulation; physical properties | No. 18 | No. 19 | No. 20 | No. 21 |
|---|---|---|---|---|
| Ethylene-hexafluoropropene copolymer | 75 | 50 | 25 | 100 |
| Daiel® G-501 | 25 | 50 | 75 | 0 |
| MT carbon black | 20 | 20 | 5 | 20 |
| Magnesium oxide | 15 | 15 | 30 | 15 |
| tert-Butyl peroxybenzoate | 3.7 | 3.7 | 3.7 | 3.7 |
| Triallyl isocyanurate | 2.5 | 2.5 | 2.5 | 2.5 |
| Curing: | | | | |
| Press curing temp. (° C) | 160 | 160 | 150 | 160 |
| Press curing time (min.) | 13 | 22 | 18 | 12 |
| Mechanical properties (room temp.): | | | | |
| 100 % Modulus (kg/cm$^2$) | 49 | 49 | 37 | 49 |
| Tensile strength (kg/cm$^2$) | 159 | 153 | 131 | 170 |
| Elongation (%) | 200 | 230 | 350 | 210 |
| Hardness (JIS-A) | 65 | 68 | 68 | 63 |
| Properties after aging in heated air*[1]: | | | | |
| Retention of tensile strength (%) | 92 | 106 | 141 | 80 |
| Retention of elongation (%) | 75 | 78 | 73 | 73 |
| Change in hardness | +6 | +4 | +3 | +6 |

Note:
*[1]Aged in air at 200° C for 72 hours by use of a Geer oven tester.

EXAMPLE 6

The same ethylene-hexafluoropropene copolymer as used in Example 5 and the same Daiel® G-501 as used in Example 4 were masticated by means of a 50-ml kneader for testing high viscosity (made by Irie Tekkosho Co.). To 100 parts of the resulting homogeneous mixture, was added with continued kneading a mixture comprising 20 parts of MT carbon black, 15 parts of magnesium oxide as acid acceptor, 3.0 parts of 1,1-bis-tert-butylperoxy-3,3,5-trimethylcyclohexane as curing agent, and 2.5 parts of triallyl isocyanurate as curing promoter.

After having been kneaded, the stock was passed through the clearance of a two-roll mill to form a sheeting of standard thickness which was press-cured in a standard mold at 140° C for 12 minutes to obtain a cured sheet.

Physical properties of the cured sheets were as shown in Table 6.

Table 6

| Formulation; physical properties | No. 22 | No. 23 |
|---|---|---|
| Formulation: | | |
| Ethylene-hexafluoropropene copolymer | 75 | 50 |
| Daiel® G-501 | 25 | 50 |
| MT carbon black | 20 | 20 |
| Magnesium oxide | 15 | 15 |
| 1,1-bis-tert-butylperoxy-3,3,5-trimethylcyclohexane | 3.0 | 3.0 |
| Triallyl isocyanurate | 2.5 | 2.5 |
| Mechanical properties (room temp.): | | |
| 100 % Modulus (kg/cm$^2$) | 22 | 24 |
| Tensile strength (kg/cm$^2$) | 140 | 108 |
| Elongation (%) | 460 | 490 |
| Hardness (JIS-A) | 63 | 67 |
| Aging test in heated air*[1]: | | |
| Retention of tensile strength (%) | 74 | 96 |
| Retention of elongation (%) | 78 | 85 |
| Change in hardness | +2 | −1 |

Note:
*[1]Aged in air at 200° C for 72 hours by use of a Geer oven tester.

EXAMPLE 7

As shown in Table 7, prescribed quantities of ethylene-hexafluoropropene copolymer of varied hexafluoropropene contents and varied intrinisic viscosities (as measured in methyl ethyl ketone at 30° C) and Daiel® G-501 were masticated on a two-roll mill. To each of the resulting homogeneous mixtures, were successively added with continued milling 5 parts of MT carbon black, 20 parts of magnesium oxide as acid acceptor, 3 parts of benzoyl peroxide as curing agent, and 3 parts of triallyl isocyanurate as curing promoter.

After having been milled, the stock was passed through the roll clearance to form a sheeting of standard thickness which was press-cured in a standard mold at 120° C for 30 minutes to obtain a cured sheet (No. 24 and No. 25).

For comparison, a cured sheet was prepared in the same manner as mentioned above, except that the vinylidene fluoride copolymer was not used (No. 26).

Physical properties of the cured sheets were as shown in Table 7.

Table 7

| | No. 24 | No. 25 | No. 26 |
|---|---|---|---|
| Ethylene-hexafluoropropene copolymer: | | | |
| Hexafluoropropene content (mole-%) | 32.0 | 24.6 | 22.0 |
| Intrinsic viscosity | 1.00 | 1.42 | 0.91 |
| Formulation: | | | |
| Ethylene-hexafluoropropene copolymer | 33 | 50 | 100 |
| Daiel® G-501 | 67 | 50 | 0 |
| MT carbon black | 5 | 5 | 5 |
| Magnesium oxide | 20 | 20 | 20 |
| Benzoyl peroxide | 3 | 3 | 3 |
| Triallyl isocyanurate | 3 | 3 | 3 |
| Mechanical properties (room temp.): | | | |
| 100 % Modulus (kg/cm$^2$) | 17 | 24 | 16 |
| Tensile strength (kg/cm$^2$) | 143 | 151 | 133 |
| Elongation (%) | 500 | 320 | 340 |
| Hardness (JIS-A) | 69 | 67 | 57 |
| Properties after aging in heated air (in Geer oven at 200° C for 70 hours) | | | |
| 100 % Modulus (kg/cm$^2$) | 22 | 82 | — |
| Tensile strength (kg/cm$^2$) | 205 | 117 | 70 |
| Elongation (%) | 430 | 120 | 30 |
| Hardness (JIS-A) | 68 | 79 | 88 |
| Chemical resistance (volume change in %; immersion at 35° C for 70 hours) | | | |
| Benzene | +42 | +69 | +125 |
| Isooctane | +16 | +33 | +99 |

What is claimed is:

1. A cured rubber composition prepared by curing with an organic peroxide as a curing agent, a composition consisting essentially of 99 to 5 parts by weight of (A) a fluorine-containing ethylene copolymer of ethylene, hexafluoropropene and if desired other ethylenically unsaturated monomers containing 10 to 50 mole % of hexafluoropropene and 0 to 50 mole % of the other ethylenically unsaturated monomers and 1 to 95 parts by weight of (B) a silicone rubber prepared by polycondensation of a silanol compound represented by the general formula

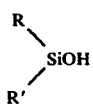

(wherein R and R' are saturated aliphatic groups, unsaturated aliphatic groups, aromatic groups, or derivatives of these groups) alone or polycondensation of a combination of two or more of said silanol compound and/or (C) a fluorine-containing copolymer of vinylidene fluoride and at least one other fluorine-containing olefinic monomer.

2. A cured rubber composition according to claim 1, wherein the composition consists essentially of said fluorine-containing ethylene polymer and said silicone rubber.

3. A cured rubber composition according to claim 1, wherein the composition consists essentially of said fluorine-containing ethylene polymer and said fluorine-containing polymer.

4. A cured rubber composition according to claim 1, wherein the fluorine-containing ethylene polymer is one member selected from the group consisting of ethylene-hexafluoropropene copolymer and ethylene-hexafluoropropene-ethylenically unsaturated monomer terpolymer.

5. A cured rubber composition according to claim 1, wherein the fluorine-containing polymer is one member selected from the group consisting of vinylidene fluoride-hexafluoropropene copolymer and vinylidene fluoride-hexafluoropropene-fluorine-containing olefinically unsaturated monomer terpolymer.

6. A cured rubber composition according to claim 5, wherein the fluorine-containing olefinically unsaturated monomer is tetrafluoroethylene.

7. A cured rubber composition according to claim 1, wherein the silicone rubber is composed mainly of polydimethylsiloxane and contains varied proportions of derivatives thereof having an ethyl group, vinyl group, phenyl group, or fluoroalkyl group introduced in the side chain to meet the required degree of cure as well as physical properties.

8. A cured rubber composition according to claim 1, wherein the organic peroxide is added in a proportion of 0.1 to 15 parts by weight per 100 parts by weight of the composition.

9. A cured rubber composition according to claim 1, wherein the organic peroxide is added in a proportion of 1 to 8 parts by weight per 100 parts by weight of the composition.

10. A cured rubber composition according to claim 1, wherein the curing is carried out in the presence of a curing promoter in an amount of 1 to 20 parts by weight per 100 parts by weight of the composition.

11. A cured rubber composition according to claim 1, wherein the curing is carried out at a temperature of 120° to 200° C.

12. A cured rubber composition according to claim 1, wherein the organic peroxide is at least one member selected from the group consisting of compounds represented by the general formula,

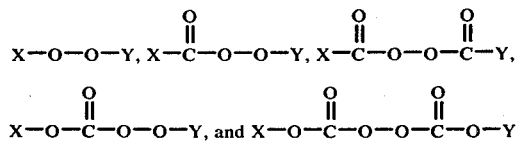

wherein X represents an alkyl or aralkyl group having 1 to 20 carbon atoms and derivative groups thereof, Y represents an alkyl or aralkyl group having 1 to 20 carbon atoms and derivative group thereof and a hydrogen atom, X and Y being the same or different.

13. A cured rubber composition according to claim 12, wherein the organic peroxide is tert-butylcumyl peroxide, dicumyl peroxide, decanoyl peroxide, benzoyl peroxide or tert-butyl peroxybenzoate.

14. A cured rubber composition according to claim 4, wherein the ethylenically unsaturated monomer in the fluorine-containing ethylene polymer is methyl and ethyl acrylates and methacrylates, vinyl chloride, vinyl fluoride, vinylidene chloride, vinylidene fluoride, tetrafluoroethylene or trifluorochloroethylene.

15. A cured rubber composition according to claim 1, wherein the composition is incorporated with additives.

16. A cured rubber composition according to claim 15, wherein the additives are acid acceptors, inorganic fillers and curing promoters.

17. A cured rubber composition according to claim 10, wherein the curing promoter is a triallyl ester of cyanuric acid, isocyanuric acid, or benzenetricarboxylic acid; diallyl phthalate, or N,N'-methylenebisacrylamide.

* * * * *